(12) United States Patent
Miller et al.

(10) Patent No.: US 11,913,534 B2
(45) Date of Patent: Feb. 27, 2024

(54) FRONT CHAINRING ASSEMBLY

(71) Applicant: SRAM, LLC, Chicago, IL (US)

(72) Inventors: Isaiah Miller, Spearfish, SD (US);
Nathan Keck, Spearfish, SD (US);
James Meyer, Spearfish, SD (US)

(73) Assignee: SRAM, LLC, Chicago, IL (US)

( * ) Notice: Subject to any disclaimer, the term of this patent is extended or adjusted under 35 U.S.C. 154(b) by 257 days.

(21) Appl. No.: 16/828,500

(22) Filed: Mar. 24, 2020

(65) Prior Publication Data

US 2021/0301913 A1   Sep. 30, 2021

(51) Int. Cl.
| | |
|---|---|
| *F16H 55/12* | (2006.01) |
| *F16H 55/30* | (2006.01) |
| *B62M 1/36* | (2013.01) |
| *G01L 3/24* | (2006.01) |
| *B62J 45/411* | (2020.01) |
| *B62J 45/421* | (2020.01) |
| *B62M 9/12* | (2006.01) |
| *G01L 3/10* | (2006.01) |

(52) U.S. Cl.
CPC ............ *F16H 55/12* (2013.01); *B62J 45/411* (2020.02); *B62J 45/421* (2020.02); *B62M 1/36* (2013.01); *B62M 9/12* (2013.01); *F16H 55/30* (2013.01); *G01L 3/108* (2013.01); *G01L 3/24* (2013.01)

(58) Field of Classification Search
CPC ........ F16H 55/12; F16H 55/30; B62J 45/421; B62J 45/411; B62M 1/36; B62M 9/12; G01L 3/108; G01L 3/24
USPC ........................................................ 474/152
See application file for complete search history.

(56) References Cited

U.S. PATENT DOCUMENTS

| | | | |
|---|---|---|---|
| 3,513,725 A | 5/1970 | Shimano et al. | |
| 3,900,088 A | 8/1975 | Ozaki | |
| 7,975,561 B1* | 7/2011 | Ambrosina | ............ B62M 9/105 |
| | | | 73/862.08 |
| 9,784,628 B1* | 10/2017 | Jennings | .................. B62J 50/21 |
| 10,377,445 B2* | 8/2019 | Hirose | ..................... B62M 9/12 |
| 2009/0119032 A1* | 5/2009 | Meyer | .................... B62J 45/421 |
| | | | 702/44 |

(Continued)

FOREIGN PATENT DOCUMENTS

| | | |
|---|---|---|
| CN | 101204984 B | 12/2010 |
| CN | 108801297 A | 11/2018 |

(Continued)

OTHER PUBLICATIONS

Guide to Multi-Start Threads, 2021, Jerpbak and Bayless (Year: 2021).*

*Primary Examiner* — Gene O Crawford
*Assistant Examiner* — Emily R Kincaid

(57) ABSTRACT

A chainring assembly includes a chainring carrier adapted to be coupled to a crank arm. The chainring carrier is rotatable about a rotation axis, and includes an outer periphery having carrier threads. A chainring structure includes an inner periphery having chainring threads and an outer periphery comprising a plurality of teeth. The inner periphery of the chainring structure is threadably engaged with the outer periphery of the chainring carrier. In one embodiment, a power meter device includes a body having a torque input section and a torque output section, with the torque output section including an outer periphery having threads adapted to be coupled to a chainring structure.

13 Claims, 14 Drawing Sheets

(56) References Cited

U.S. PATENT DOCUMENTS

2016/0215866 A1* 7/2016 Stefan .................... F16H 55/12
2017/0292879 A1  10/2017 Jennings et al.
2018/0141613 A1   5/2018 Collen

FOREIGN PATENT DOCUMENTS

| CN | 208198724 U   | 12/2018 |
|----|---------------|---------|
| DE |   1080890 A   |  4/1960 |
| DE |   1935063 A   |  1/1971 |
| DE |   2915013 A1  | 10/1979 |
| EP |   0647192     |  4/1995 |
| EP |   3056419     |  6/2016 |
| ES |   1057359     |  7/2004 |
| FR |    890064 A   |  1/1944 |
| FR |   1186656 A   |  8/1959 |
| GB |    647876 A   | 12/1950 |
| GB |   2019328 A   | 10/1979 |
| TW | 200827197     |  7/2008 |
| TW | 201307145 A   |  2/2013 |
| TW |    I576275    |  4/2017 |
| TW | 201946827 A   | 12/2019 |
| WO |   9401313 A1  |  1/1994 |

\* cited by examiner

FRONT CHAINRING ASSEMBLY

FIELD OF THE DISCLOSURE

The present application generally relates to a front chainring assembly having a removable chainring structure threadably engaged with a chainring carrier, which may include a power meter device.

BACKGROUND

A bicycle rider may desire information regarding the amount of power being input into a drive train of a bicycle during use. To accommodate this desire, a power meter device having torque input and output sections may be installed on the bicycle. It also may be desirable to ensure that the power meter device may be used with different chainrings, both to reduce repair and replacement costs as well as providing the rider with different chainring configurations and gear ratio options. At the same time, however, it may be desirable to minimize the weight of the drive train, especially in a competitive cycling environment, without sacrificing the performance of the drive train and/or power meter device.

SUMMARY

In one aspect, one embodiment of a front chainring assembly includes a chainring carrier adapted to be coupled to a crank arm. The chainring carrier is rotatable about a rotation axis, and includes an outer periphery having carrier threads. A chainring structure includes an inner periphery having chainring threads and an outer periphery comprising a plurality of teeth. The inner periphery of the chainring structure is threadably engaged with the outer periphery of the chainring carrier.

In another aspect, one embodiment of a power meter device includes a body having a torque input section and a torque output section. The body is configured to transmit power between the torque input section and the torque output section, with the torque input section being adapted to be coupled to a crank arm. The body is rotatable about a rotation axis. The torque output section includes an outer periphery having threads adapted to be coupled to a chainring structure. A plurality of strain measurement devices are coupled to the body, with the plurality of strain measurement devices configured to provide a signal indicative of strain detected in the body. Circuitry is provided for interpreting the signal and determining a corresponding power transmitted between the torque input section and the torque output section.

The various embodiments of the front chainring assembly and power meter device, and the methods for the use and assembly thereof provide significant advantages over other chainring assemblies, power meter devices, and methods. For example and without limitation, a chainring structure can be quickly and easily replaced simply by rotating the chainring structure relative to the chainring carrier. The threaded engagement eliminates the need for lugs and bolts interfacing between the chainring carrier and the chainring structure, and the attendant time and costs associated with disassembling the assembly. As such, the overall weight of the assembly may be reduced while maintaining the ability to easily replace or interchange chainrings. Moreover, the chainring carrier may be incorporated into a power meter device, which provides for reliable performance of the power meter.

The foregoing paragraphs have been provided by way of general introduction and are not intended to limit the scope of the claims presented below. The various preferred embodiments, together with further advantages, will be best understood by reference to the following detailed description taken in conjunction with the accompanying drawings.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

It should be understood that the term "plurality," as used herein, means two or more. The term "longitudinal," as used herein means of or relating to a length or lengthwise direction. The term "lateral," as used herein, means situated on, directed toward or running in a side-to-side direction. The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components. The terms "upper," "lower," "rear," "front," "fore," "aft," "vertical," "horizontal," "right," "left," "inboard," "outboard" and variations or derivatives thereof, refer to the orientations of an exemplary bicycle 50, shown in FIG. 1, from the perspective of a user seated thereon, for example with an "inboard" component or feature being closer to a vertical mid-plane of the bicycle extending in a direction A. The term "transverse" means non-parallel. The terms "outer" and "outwardly" refers to a direction or feature facing away from a centralized location, for example the phrases "radially outwardly," "radial direction" and/or derivatives thereof, refer to a feature diverging away from a centralized location, for example a rotation axis 4 of the chainring assembly as shown in FIG. 2. Conversely, the terms "inward" and "inwardly" refers to a direction facing toward the centralized or interior location. The term "subassembly" refers to an assembly of a plurality of components, with subassemblies capable of being further assembled into other subassemblies and/or a final assembly, such as the bicycle 50.

Figure 1:
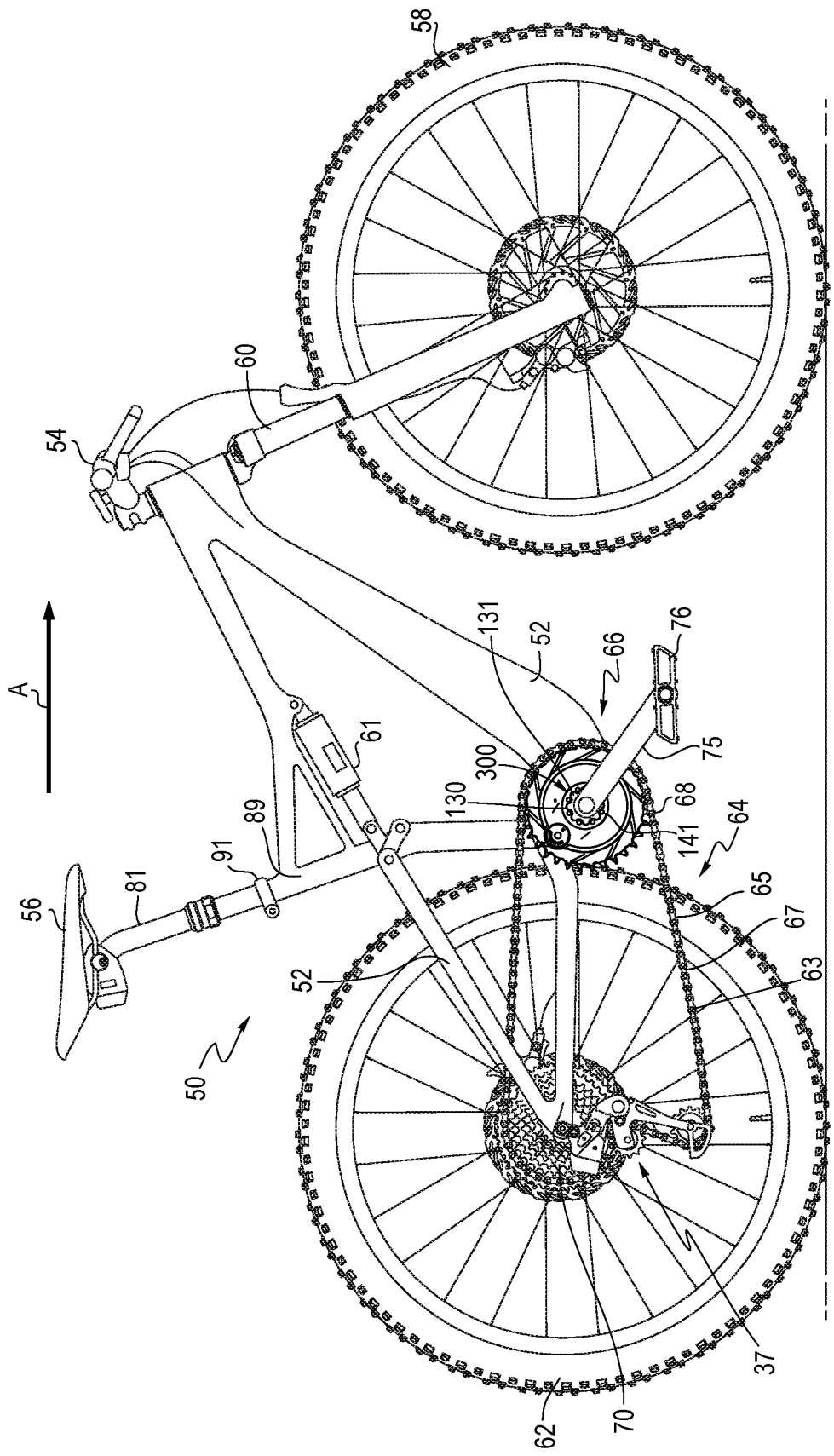
FIG. 1 is a side view of one example of a bicycle.
Figure 2:
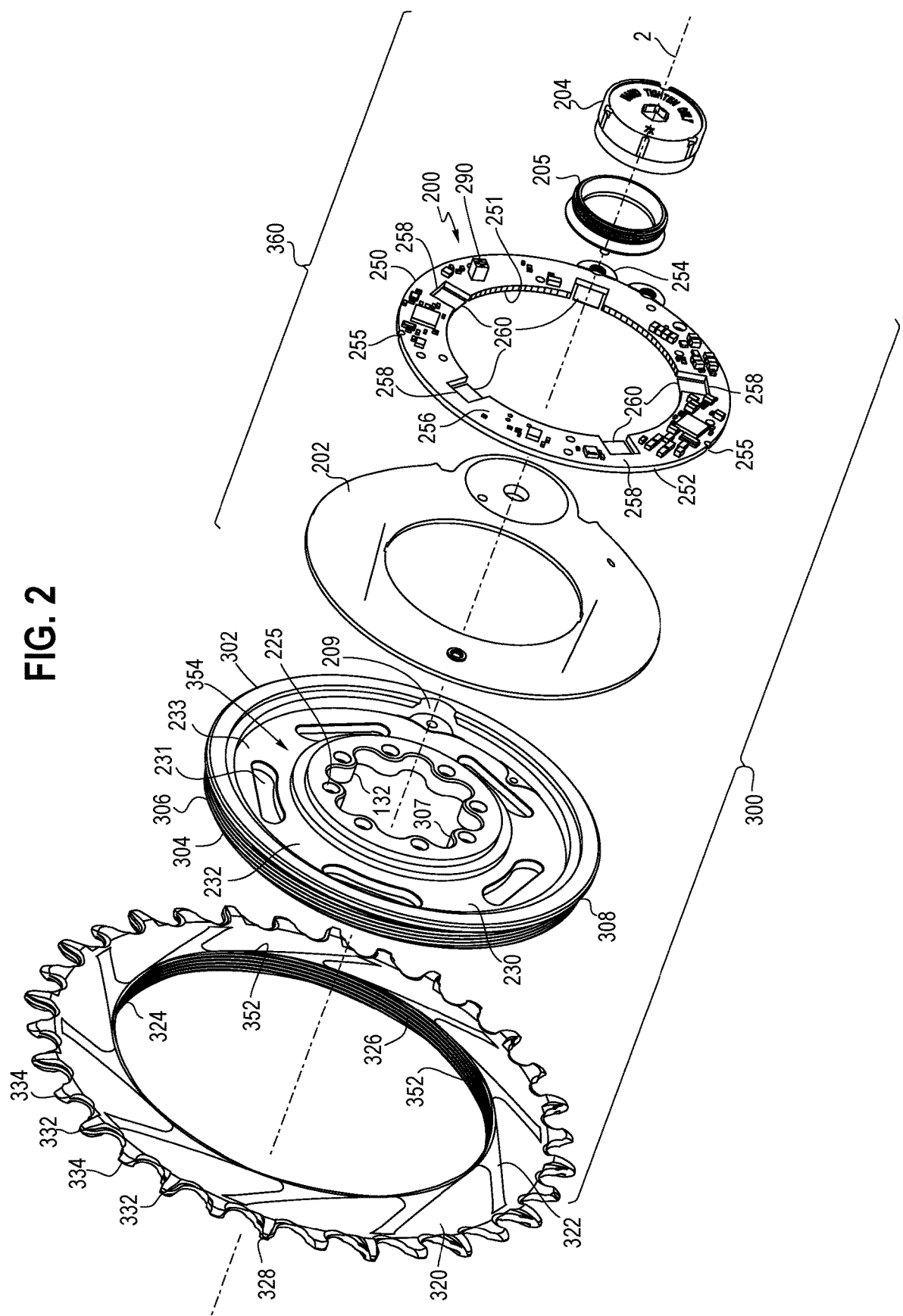
FIG. 2 is an exploded perspective view of one embodiment of a front chainring assembly including a power meter device.
Figure 3:
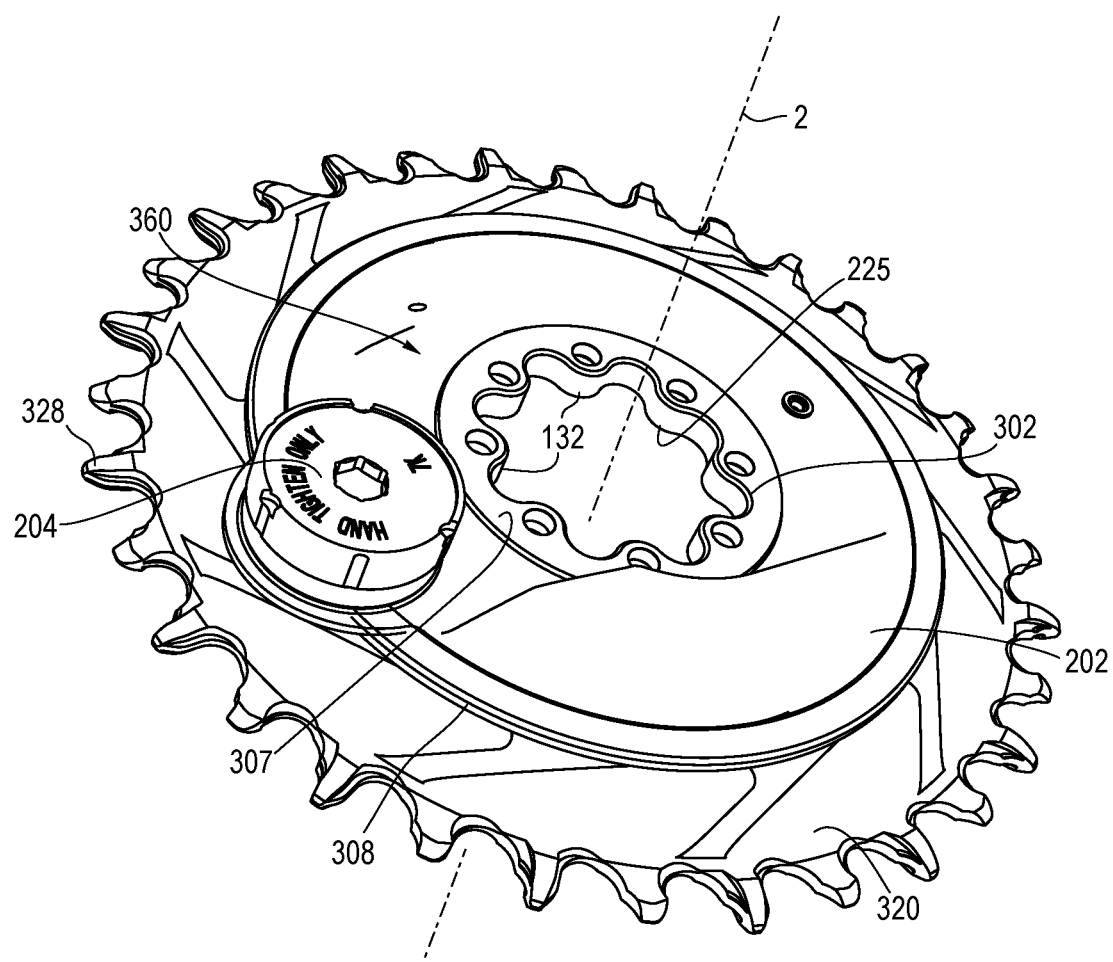
FIG. 3 is a front perspective view of one embodiment of a front chainring assembly including a power meter device.
Figure 4:
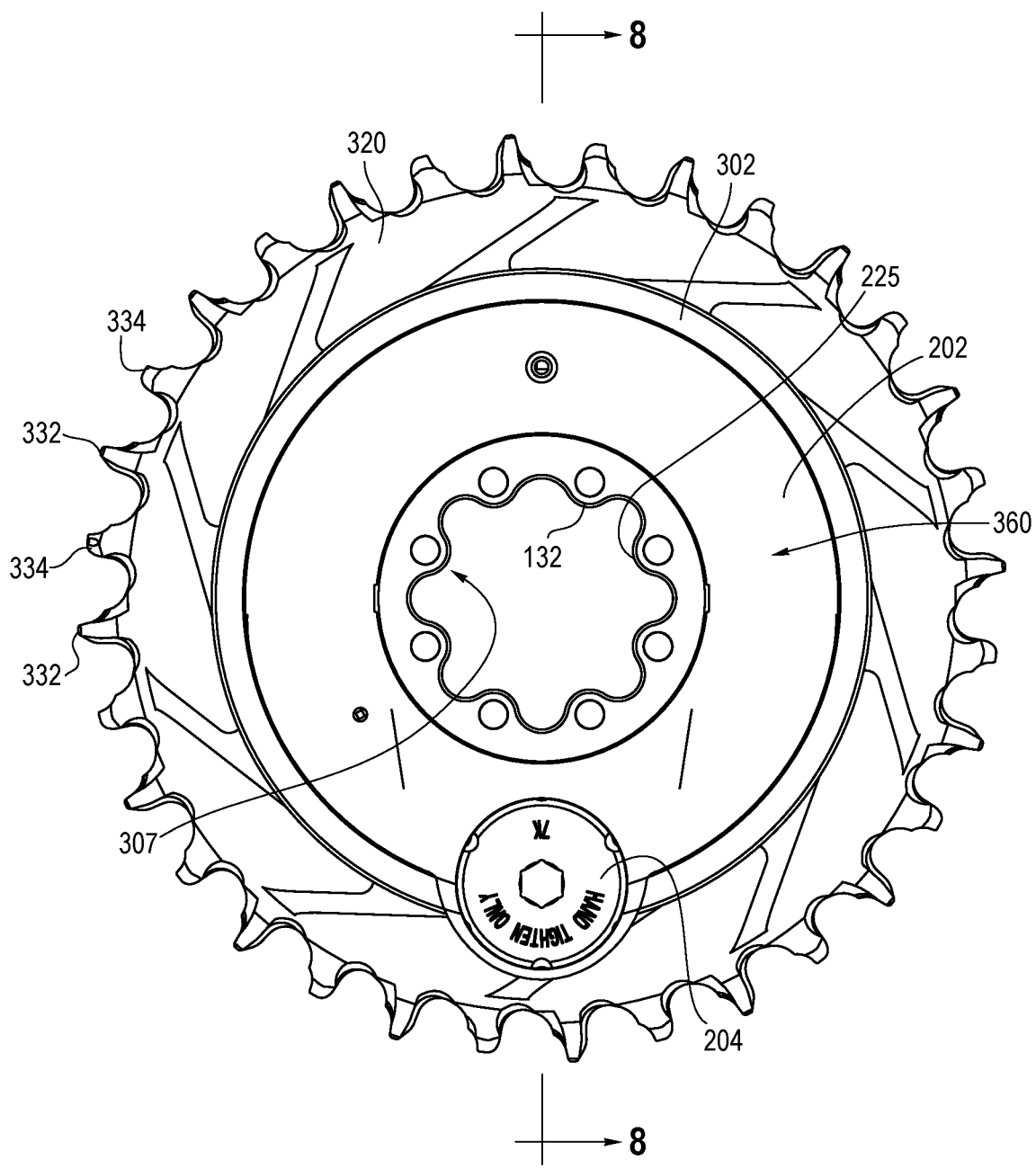
FIG. 4 is a side view of the front chainring assembly and power meter device shown in FIG. 3.
Figure 5:
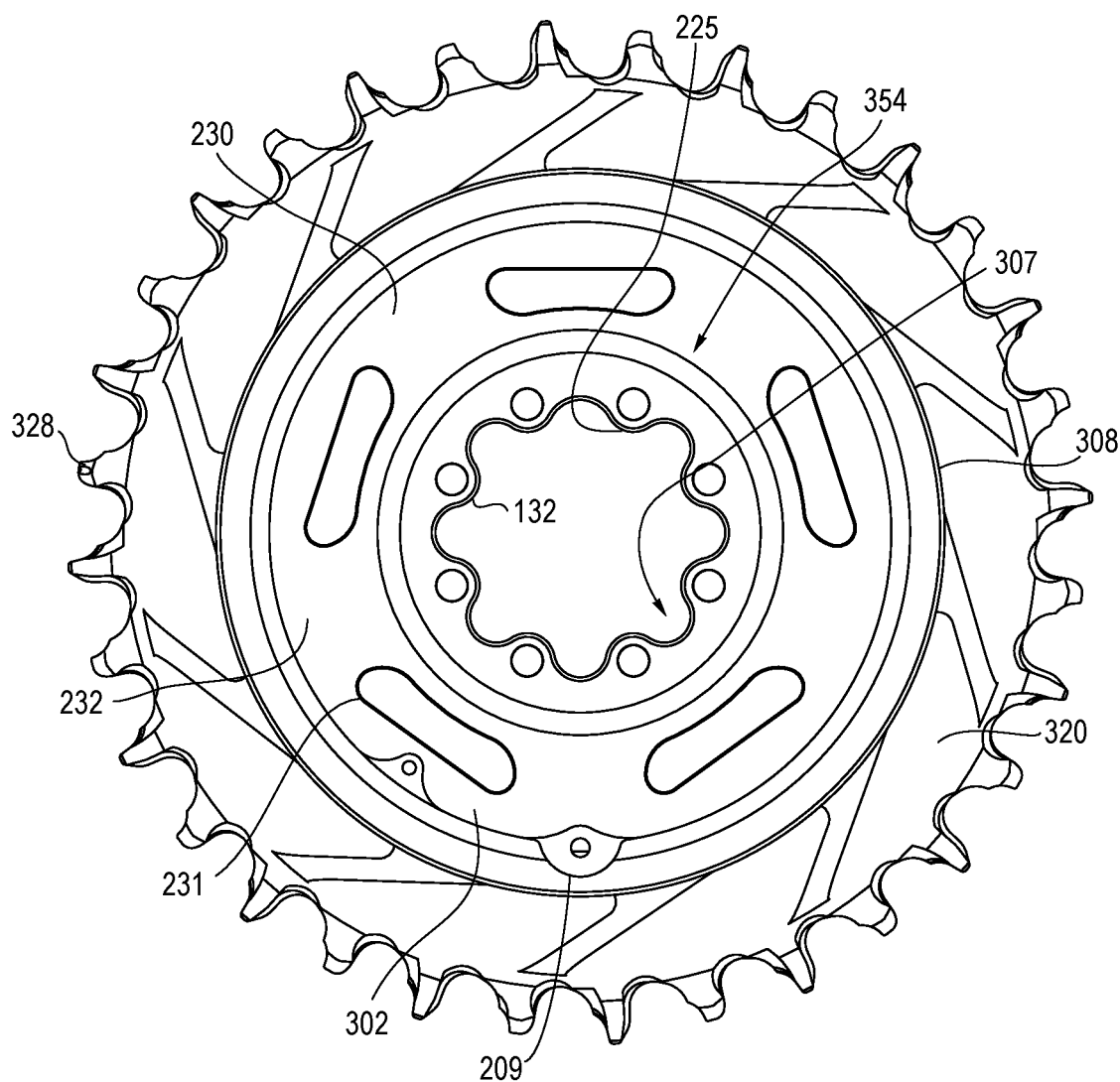
FIG. 5 is a side view of the front chainring assembly shown in FIG. 4 without a power meter device.

FIG. 1 illustrates one example of a human powered vehicle. In this example, the vehicle is one possible type of bicycle 50, such as a mountain bicycle. The bicycle 50 has a frame 52, handlebars 54 near a front end of the frame, and a seat or saddle 56 for supporting a rider over a top of the frame. The bicycle 50 also has a first or front wheel 58 carried by a front fork subassembly 60 supporting the front end of the frame. The bicycle 50 also has a second or rear wheel 62 supporting a rear end of the frame 52. The rear end of the frame 52 may be supported by a rear suspension component 61, such as a rear shock. The bicycle 50 also has a drive train 64 with a crank assembly 66 that is operatively coupled via a roller chain 68 to a rear cassette 70 or a driven sprocket assembly near the hub providing a rotation axis of the rear wheel 62. The roller chain 68 includes a plurality of inner links and plurality of outer links that interconnected in an alternating manner by a plurality of pins 63. Each of the inner links includes a pair of parallel inner link plates 67. Each of the outer links includes a pair of parallel outer link plates 65. Each of the pins 63 has a roller that is rotatably disposed thereon. The crank assembly 66 includes at least one, and typically two, crank arms 75 and pedals 76, along with a front chainring assembly 300 or a drive sprocket assembly. A crank spindle or shaft (not shown) may connect the two crank arms. The crank shaft defines a center rotational axis 2 of the chainring assembly 300. The crank assembly may also include other components.

A rear gear change device 37, such as a derailleur, is disposed at the rear wheel 62 to move the roller chain 68 through different sprockets of the cassette 70. In one embodiment, a front gear changer device, such as a derailleur, may be provided to move the chain 68 through multiple sprockets of the chainring assembly. In the illustrated example, the saddle 56 is supported on a seat post 81 having an end portion received in a top of a frame seat tube 89 of the frame. A clamping ring 91 may be tightened to secure the upper seat tube 81 to the lower frame seat tube 89.

In FIG. 1, the arrow A depicts a normal riding or forward moving direction of the bicycle 50. While the bicycle 50 depicted in FIG. 1 is a mountain bicycle, the chainring assembly 300, including the specific embodiments and examples disclosed herein as well as alternative embodiments and examples, may be implemented on other types of bicycles. For example and without limitation, the disclosed chainring assembly 300 may be used on road bicycles, as well as bicycles with mechanical (e.g., cable, hydraulic, pneumatic, etc.) and non-mechanical (e.g., wired, wireless) drive systems.

Figure 6:
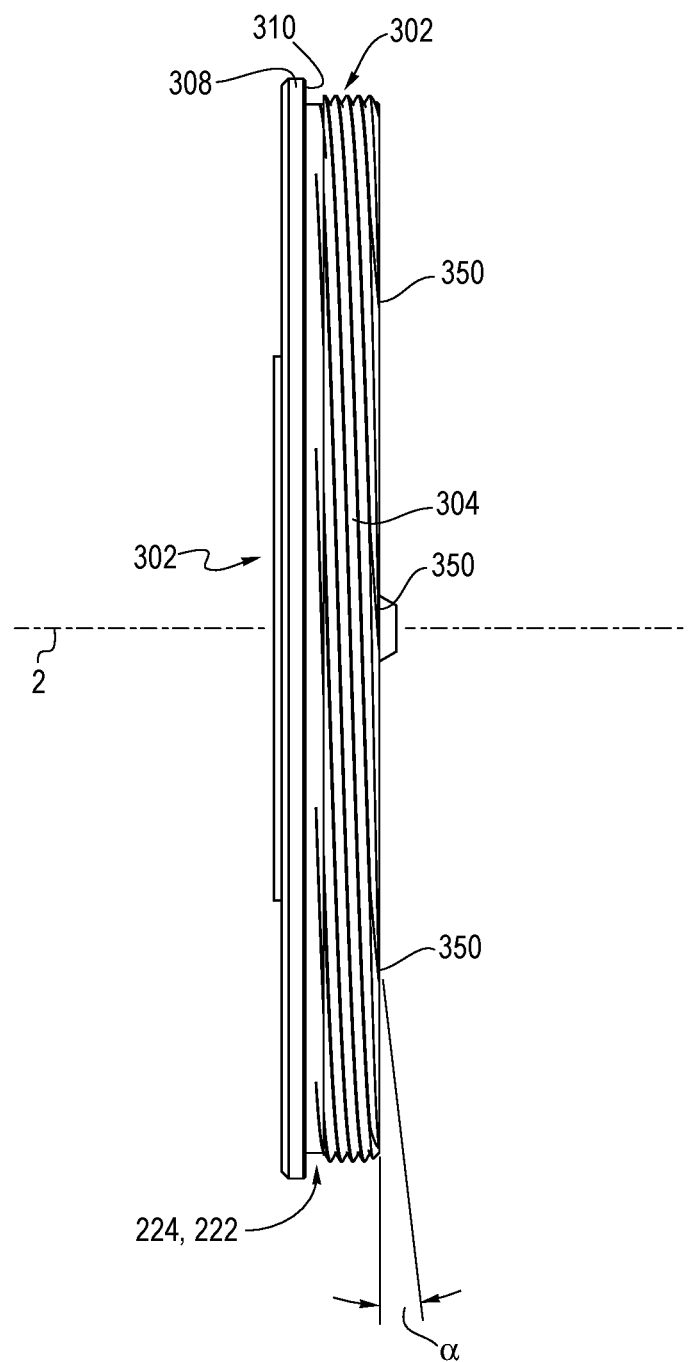
FIG. 6 is a front-end view of one embodiment of a chainring carrier.
Figure 7:
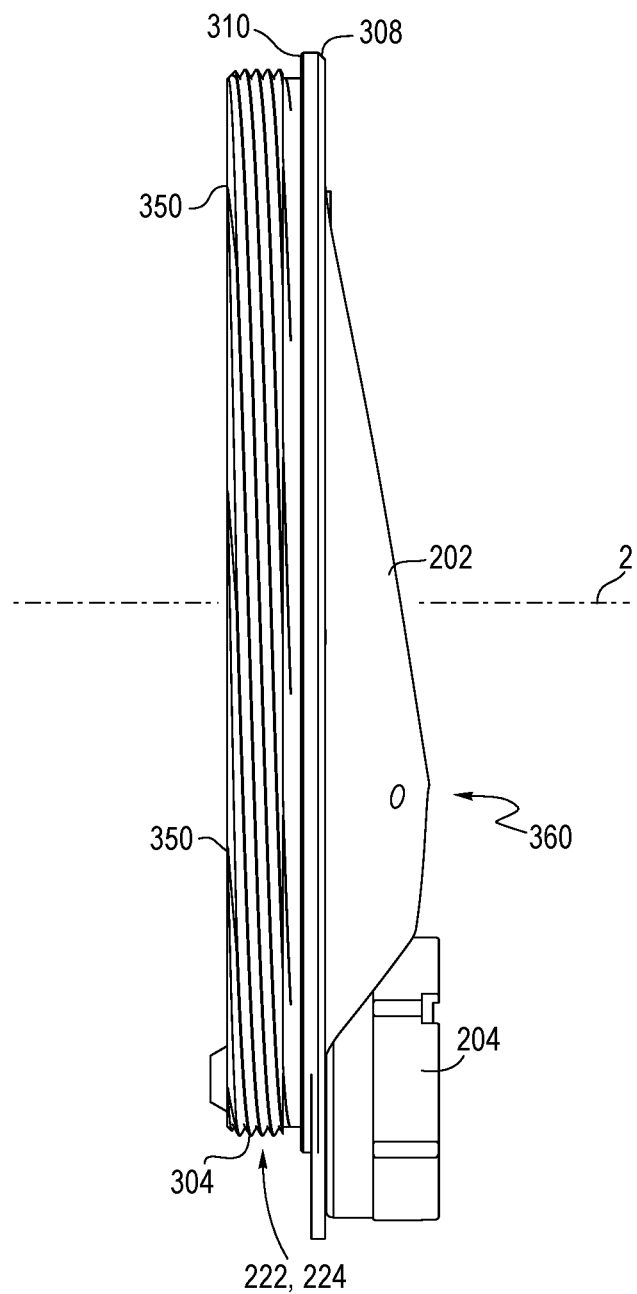
FIG. 7 is a rear end view of one embodiment of chainring carrier with a power meter device coupled thereto.

Now referring to FIGS. 2-12 and 14-17, the front chainring assembly 300 includes a chainring carrier 302 that is adapted to be coupled to one of the crank arms 75. The chainring carrier is rotatable about the rotation axis 2. The chainring carrier includes an outer periphery 306, or outer diameter/circumference, configured with carrier threads 304. The chainring carrier 302 includes an annular shoulder 308, configured as a radially extending flange, that extends radially outwardly adjacent the carrier threads 304 on the outer periphery of the carrier. The annular shoulder defines a stop surface 310, formed along an inboard face of the shoulder 308 in one embodiment. The stop surface 310 is substantially planar and is arranged vertically when the bicycle is in an upright riding position as shown in FIG. 1. The shoulder 308 has a greater outer diameter than the carrier threads 304, such that the stop surface 310 is exposed to an outboard side surface, or face 322, of a chainring structure 320, 1320, 2320 threadably engaged with the carrier threads 304. The annular shoulder 308 may be positioned outboard of the carrier threads 304 as shown in FIG. 6 in an axial direction, defined for example by the axis 2, or located inboard of the carrier threads in the axial direction in other embodiments.

The chainring carrier 302 includes, or has formed thereon, one of a first or second pairing feature 131, 132, while the crank arm 75 includes, or has formed thereon, the other of the first or second pairing feature 131, 132. The first and second pairing features 131, 132 position the chainring carrier 302 relative to the crank arm 75 and provide a torque-transmitting coupling between the crank arm 75 and the chainring carrier 302. In another embodiment, the crank arms and the carrier may be torque transmittingly coupled in other ways, such as by being directly attached to the crank spindle and/or each other.

In one embodiment, the chainring structure 320 is a single or solitary chainring or drive sprocket configured as an annular sprocket with an inner periphery 324, or inner circumference/diameter, configured with chainring threads 326 and an outer periphery configured with a plurality of circumferentially spaced teeth 328, which engage the roller chain 68. The number of teeth may range between twenty-eight and forty-eight teeth. The inner periphery 324 of the chainring, and in particular the chainring threads 326, is/are threadably engaged with the outer periphery 306 of the chainring carrier, and in particular the carrier threads 304. The chainring 320 is rotatable relative to the chainring carrier 302 between a disengaged position and an engaged position, wherein the chainring 320, and in particular the outboard surface or face 322 thereof, engages the stop surface 310 when the chainring 320 is in the engaged position. The chainring 320 may be configured with a single, double or triple ring(s), with at least one of the ring(s) having or defining the inner threaded periphery 324. In one embodiment, the plurality of teeth 328 of the chainring 320 includes a first group of teeth 332 and a second group of teeth 334, wherein the first group of teeth 332 have an axial width W1 greater than an axial width W2 of the second group of teeth 334. Each of the first group of teeth 332 has an axial width W1 such that the teeth 332 fit within a space between outer link plates 65 of the roller chain 68 but do not fit within a space between the inner link plates 67 of the roller chain 68.

The first group of teeth 332 may include axial protrusions 331, 333 configured to fill the space between the outer link plates 65 and/or interact with the outer link plates 65 of the roller chain 68. There may be an inboard protrusion 331 and/or an outboard protrusion 333 on the first group of teeth 332. Each of the second group of teeth 334 has an axial width W2 such that the teeth 334 fit within a space between the inner link plates 65 of the chain 68. The inboard/outboard sides or faces 321, 322 of the chainring 320 may be dished inward or outward to account for the chain line.

Figure 10:
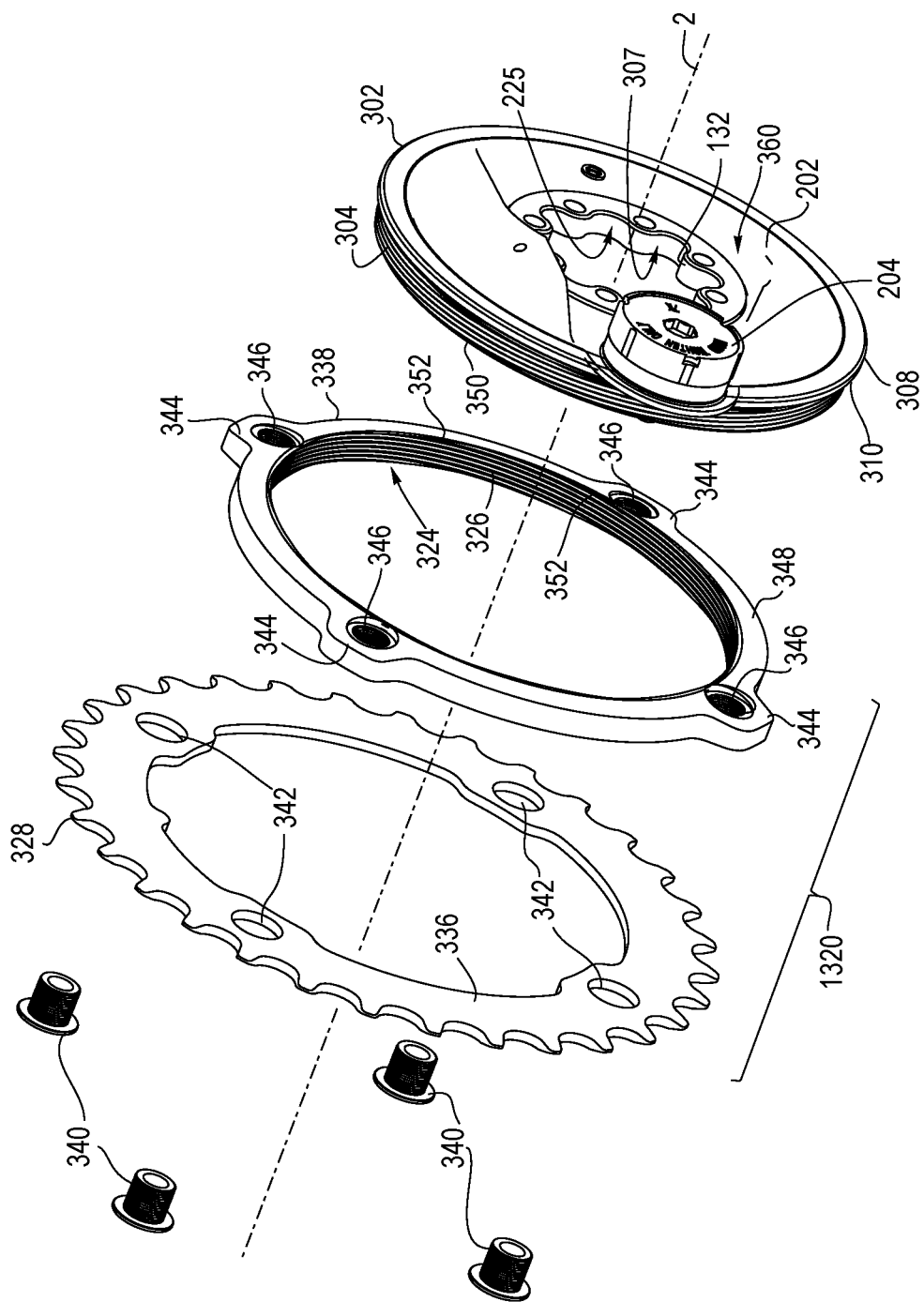
FIG. 10 is an exploded perspective view of another embodiment of a chainring assembly including a power meter device.
Figure 11:
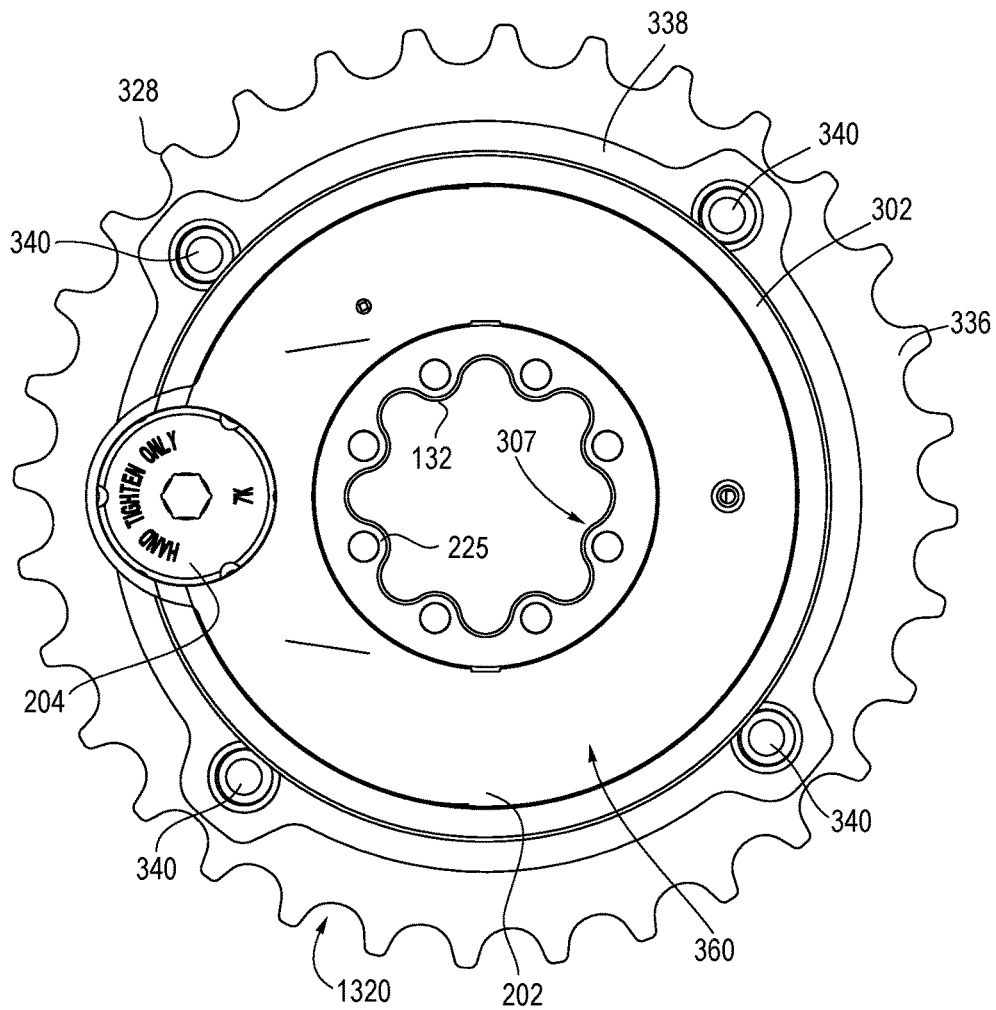
FIG. 11 is a side view of the front chainring assembly and power meter device shown in FIG. 10.

Referring to FIGS. 10 and 11, in another embodiment, the chainring structure 1320 includes a first portion 336 configured with the plurality of teeth and a second portion 338 including the chainring threads 326 and defining a surface or face 348 that abuts and engages the stop surface 310 of the carrier 302. The first and second portions may be configured as first and second annular rings, with the first portion being releasably coupled to the second portion, for example with a plurality of fasteners 340 or screws. The second portion 338, otherwise referred to as an adapter, provides an interface between the chainring carrier 302 and the first portion, which may be configured as a conventional chainring with a pattern of holes 342 (shown as four) aligned with lugs 344 (shown as four) extending radially outwardly from the adapter. Each lug 344 includes a threaded opening 346, or alternatively a through opening. The fasteners 340 are inserted through the holes 342 and threadably engage the holes 346 defined in the lugs 344 in one embodiment. Alternatively, a bolt may be inserted through the holes 342 and the through opening in the lug and be secured with a nut. It should be understood that the plurality of fasteners 340 and corresponding holes 342 and openings 346 may be more or less than four.

In another embodiment shown in FIGS. 14-17, the chainring structure 2320 is configured with a pair of (e.g., first and second) axially spaced annular drive sprockets 2321, 2323, or chainrings. A first or outboard sprocket is 2321 is configured as an annular drive sprocket with an outer periphery defined by a first outer diameter D1 and configured with a first plurality of circumferentially spaced teeth 328, which engage the roller chain 68 when the roller chain 68 is shifted onto the outboard sprocket 2321, for example by the front gear changer device, such as a derailleur. A second or inboard sprocket 2323 is configured as an annular drive sprocket with an outer periphery defined by a second outer diameter D2 and configured with a second plurality of circumferentially spaced teeth 2328, which engage the roller chain 68 when the chain 68 is shifted onto the inboard sprocket 2323, for example by the front gear changer device, such as a derailleur. The inboard sprocket 2323 is coupled to the outboard sprocket 2321 with at least a circumferential or annular wall 2325. The annular wall 2325 may be formed of the same single piece material as the outboard sprocket 2321 and inboard sprocket 2323. In one embodiment, the outer diameter D1 is greater than outer diameter D2. The number of teeth of the outboard sprocket 2321 may range between forty-six and fifty teeth and the number of teeth of the inboard sprocket 2323 may range between thirty-three and thirty-seven teeth. The front gear changer device is operable to move the chain between the inboard and outboard sprockets 2323, 2321. The chainring structure 2320 has an inner periphery 324 or inner circumference/diameter, configured with chainring threads 326. The chainring threads 326, is/are threadably engaged with the outer periphery 306 of the chainring carrier, and in particular the carrier threads 304. The chainring structure 2320 is rotatable relative to the chainring carrier 302 between a disengaged position and an engaged position, wherein the chainring structure 2320, and in particular the outboard surface or face 2322 thereof, engages the stop surface 310 when the chainring structure 2320 is in the engaged position. The outboard and outboard sprockets 2321, 2323 may have various recesses or openings to lighten the chainring 2320.

Both the chainring threads 326 and the carrier threads 304 may be configured with a plurality of thread starts 350, 352 in various embodiments. For example, the chainring threads and the carrier threads may each include at least three thread starts. In one embodiment, the chainring threads and the carrier threads each include at least nine thread starts, which allows for a greater angle of approach. Nine thread starts results in about 5/9 of a rotation for installation of the chainring structure 320, 1320, 2320 on the carrier 302, or rotation between a disengaged position and an engaged position. In this way, the multiple starts provide for minimal rotation during installation, but allows for sufficient rotation preventing inadvertent loosening of the chainring structure from the carrier, for example if the chainring is accidentally struck by an obstacle such as a rock while a user is riding the bicycle.

The angle of approach may be described as the helix angle (a). Less than three starts may create an unnecessarily flat approach between the face 322, 348, 2322 of the chainring structure and the stop surface 310 of the shoulder, such that the torque or force required to loosen or remove the chainring structure becomes excessive. In various embodiments, the helix angle (a) is between and including 0.5° and 2.0°, and preferably less than 2.5°, so the chainring structure 320, 1320, 2320 does not become self-releasing from the carrier 302 once the chainring structure 320, 1320, 2320 is installed on the carrier 302 and torqued to a pre-determined amount. It should be understood that in some embodiments, the chainring threads 326 and the carrier threads 304 may be single start and may be either formed as right or left hand threads so long as the chainring structure 320, 1320, 2320 tightens against the shoulder stop surface 310, or alternatively a lock pin, with pedaling. The lateral, inboard/outboard positioning of the chainring structure 320, 1320, 2320 can be defined by the location of the shoulder 308 and stop surface 310 along the axial direction, or alternatively a pin that can be used to lock the chainring structure into position or some combination of both. If needed, rotational alignment can be accomplished via thread clocking or pin location clocking between the chainring structure and carrier.

As mentioned, the pattern of the threads 304, 326 on the chainring structure and carrier are oriented such that chainring tightens on the carrier during riding. Accordingly, in the embodiment of FIGS. 8 and 9, wherein the carrier threads 304 are positioned inboard of the shoulder 308 and stop surface 310, and the chainring structure 320, 1320, 2320 is threaded onto the carrier 302 from the inboard side of the carrier, the threads 304, 326 are right-hand threads, or tighten by a clockwise rotation, meaning the chainring structure 320, 1320, 2320 rotates clockwise relative to the carrier 302 when viewed from the inboard side and the carrier 302 rotates clockwise relative to the chainring structure 320, 1320, 2320 when viewed from the outboard side. If the carrier threads 304 are positioned outboard of the shoulder 308 and stop surface 310, the threads 304, 326 are preferably configured as left-hand threads, or tighten by counterclockwise rotation. In one embodiment, the chainring threads 326 and the carrier threads 304 are configured as 60° V threads, although it should be understood that other types of threads may be suitable.

During assembly, the chainring structure 320, 1320, 2320 is threaded onto the carrier 302 until the stop surface 310 engages or abuts the face 322, 348, 2322, or outboard side surface, of the chainring structure. Further rotation of the carrier 302 relative to the chainring structure 320, 1320, 2320 will frictionally secure or couple the chainring structure 320, 1320, 2320 and carrier 302 through the abutting surfaces 310, 322, 348, 2322 and through the engagement between the carrier threads 304 and the chainring threads 326. During use, opposing forces applied by the crank arm 75 to the carrier 302 and by the roller chain 68 to the chainring structure 320, 1320, 2320, will maintain the coupling of the carrier 302 and the chainring structure 320, 1320, 2320 through the abutting surfaces 310, 322, 348, 3222, and through the engagement between the carrier threads 304 and the chainring threads 326, and thereby transfer torque between the crank arm and chain, and between the carrier and chainring structure.

Figure 8:
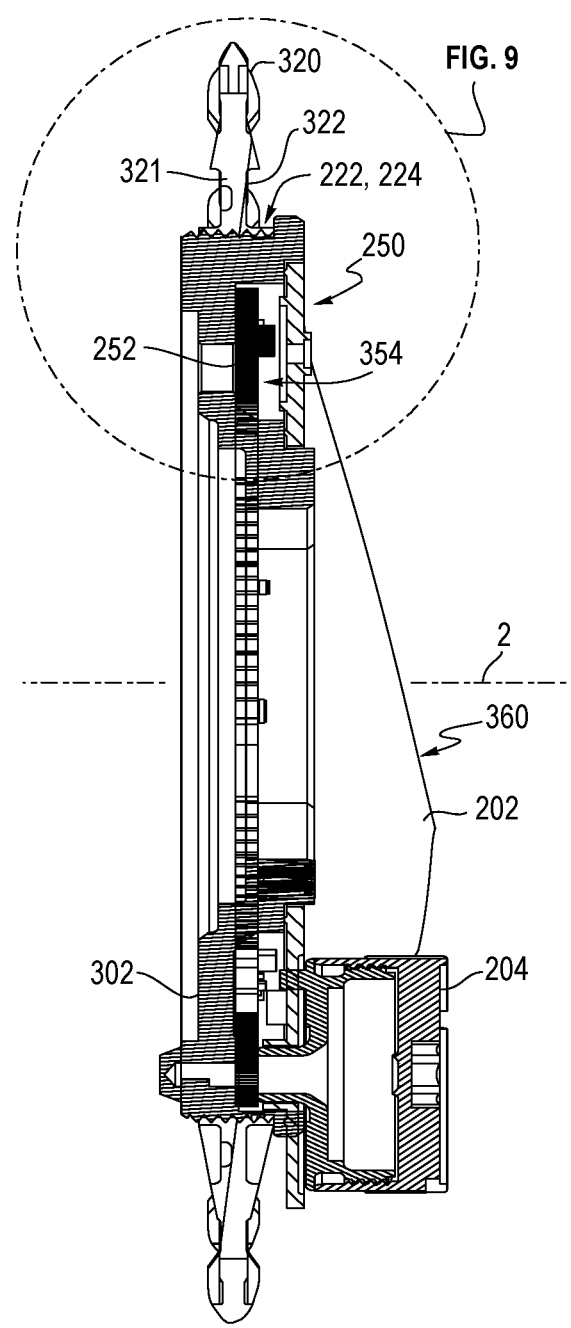
FIG. 8 is a cross-sectional view of the chainring assembly taken along line 8-8 in FIG. 4.
Figure 9:
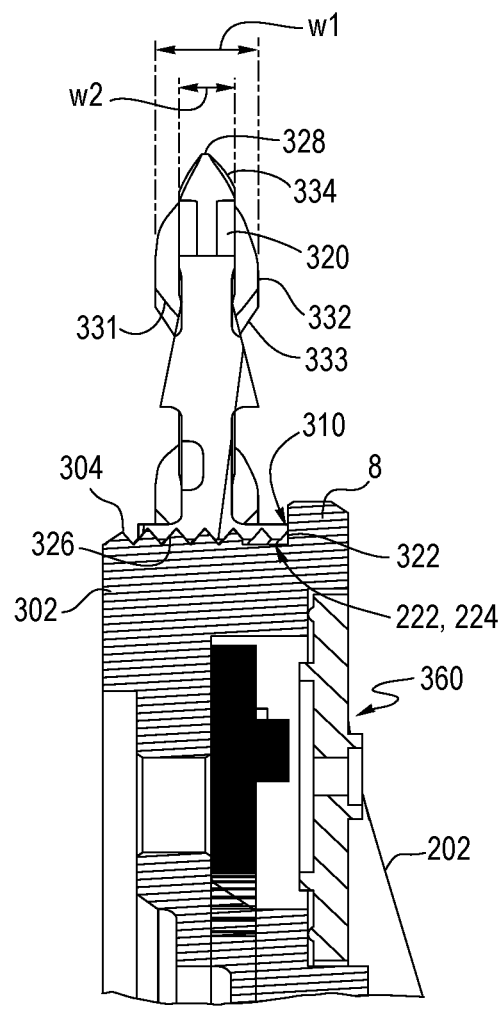
FIG. 9 is an enlarged partial cross-section of the chainring assembly taken along line 9 in FIG. 8.

Referring to FIGS. 2, 8 and 9, the chainring carrier 302 includes an annular cavity 354 disposed radially between the inner and outer peripheries 307, 306 of the chainring carrier 302 on the outboard side of the carrier. A power meter device 360 is disposed within the annular cavity 354 and coupled to the carrier 302. The power meter device 360 is configured to determine the power transmitted between the inner periphery 307 and the outer periphery 306 of the chainring carrier 302. Various embodiments and components of a suitable power meter device are disclosed in U.S. Patent Publication 2017/0292879, which is hereby incorporated herein by reference. In one embodiment, the power meter 360 includes a plurality of strain measurement devices 260 attached to a base surface 233 of the annular cavity 354. The strain measurement devices 260 are spaced apart by openings 231 in the base surface 233 of the annular cavity 354. It should be understood, however, that the chainring carrier 302 may be used on a bicycle without any power meter device coupled thereto, with the carrier 302 threadable interfacing with the chainring structure 320, 1320, 2320 as disclosed herein.

The strain measurement devices may be physically integrated with the operational circuitry of a bicycle power meter. Physically integrating strain measurement devices and operational circuitry structure may cause the construction and/or precise positioning of power meter components to be accomplished in a less expensive and/or less resource intensive manner. The strain measurement devices may be attached directly to a physical structure containing the power meter operational circuitry, such as a printed circuit board ("PCB") substrate, thus coupling the strain measurement devices and the power meter circuitry into a singular power meter PCB assembly. Further, fixably attaching the strain measurement devices to the PCB such that the position of the strain measurement devices in a plane of the PCB substrate is fixed relative to other components of the PCB assembly may allow for easier alignment and/or positioning of the strain measurement devices. For example, the alignment of the strain measurement devices may be established based on alignment of features of the PCB, which may be features of the PCB substrate and/or other PCB components.

The power meter device 360 may be integrated with a body, such as the chainring carrier 302, and may include the one or more strain measurement devices 260, such as strain gauges, arranged in a generally annular or circumferential pattern about the body. The strain measurement devices 260 are connected to circuitry and/or other sensors to generate power information, which may be transmitted to another bicycle component or external device for further processing and/or display. Alternatively, the power meter may be coupled with the chainring assembly directly, for example without the use of a chainring carrier.

The power meter 360 may include an annular printed circuit board ("PCB") with strain measurement devices attached directly to the PCB. For example, the strain measurement device may be electrical resistance type strain gauges that are generally planar and/or laminar in construction with a layer of conductive metal formed in one or more patterns on a non-electrical substrate, film, paper, or other material. The conductive metal pattern or patterns may be formed of various metallic constructions, including foil and/or wire. The conductive metal pattern or patterns may be formed of any metal or metal alloy. For example, copper or cooper alloys such as constantan may be used. Planar strain measurement devices also may include electrical contact connection surfaces configured for connection to circuitry of the PCB.

The PCB has a substrate to which components of the PCB are applied and/or attached. The substrate may form the structure and/or shape of the PCB. The substrate may be any substance operable to form the underlying attachment of the PCB components. For example, silicon, silicon dioxide, aluminum oxide, sapphire, germanium, gallium arsenide ("GaAs"), an alloy of silicon and germanium, or indium phosphide ("InP"), may be used. The substrate may be rigid or flexible. In an embodiment, the substrate forms an annular rigid ring. The rigid ring may be one continuous piece of substrate material. In an embodiment, a substrate ring has an inner diameter and an outer diameter defining the extents of the substrate there between.

The connection to the circuitry of the PCB may be accomplished using any technique. In an embodiment, the connection is accomplished through an application of layer of a conductive medium, such as solder, between the electrical contact connection surfaces of the planar strain measurement device and contact connection surfaces of the PCB which provide electrically communicative contact with other electronic components connected to the PCB, such as a processor, memory, other sensors, and/or other electric or electronic devices. Such connection may be made directly, without the use of an intermediate conductive connector, such as an elongated electrical lead, wire, or other device. For example, the conductive medium may be bounded on opposing sides by the electrical contact connection surfaces of the PCB and strain measurement device. In this example, the electrical contact connection surfaces of the PCB and strain measurement device may be secured substantially parallel and opposing each other by the conductive medium. Further, as is described above, the connection may provide that the strain measurement device is fixably attached to the PCB substrate such that the strain measurement device is secure and not movable in a radial plane of the PCB substrate relative to other features and/or components of the PCB. As described herein, the PCB may be attached to a body of a drivetrain to form a power meter.

FIGS. 2-4 and 7-12 show a body, here embodied as the chainring carrier 302, having an integrated power meter 360. The chainring carrier 302 may be made of any material operable to transmit torque, and a resulting power, between a torque input section 225 and a torque output section 222. For example, aluminum alloys may be used. The crank arm 75 is shown attached to the chainring carrier 320. The crank arm 75 has a pedal attachment section 102 to which the pedal 76 may be attached such that a bicycle rider may input pedaling forces into the bicycle drive train. These pedaling forces result in a torque that causes the crank arm 75 and attached chainring carrier 302 to rotate about the crank or rotation axis 2. The crank arm 75 has a spindle attachment feature 108 that provides for attachment to a spindle that connects the crank arm and pedal assembly disposed on an opposing side of the bicycle to facilitate pedaling with both feet of the bicycle rider. The spindle attachment feature may be any feature operable to transfer torque, such as a splined interface. As such, torque from either crank arm 75 may be transferred into the chainring carrier 302 through the crank arm 75 attachment to the chainring carrier. The crank arm 75 may be attached to the chainring carrier 302 using any technique operable to transmit torque between the crank arm 75 and a torque input section 225 of the chainring carrier 302. The torque input section 225 includes a plurality of torque-transmitting features, such as the pairing features 131, extending radially inwardly from an inner periphery 307 of the body.

In an embodiment, the crank arm 75 is connected as is described in U.S. Patent Application Publication 2015/0082939 and/or U.S. Patent Publication 2017/0292879, both of which are hereby incorporated herein by reference.

Figure 12:
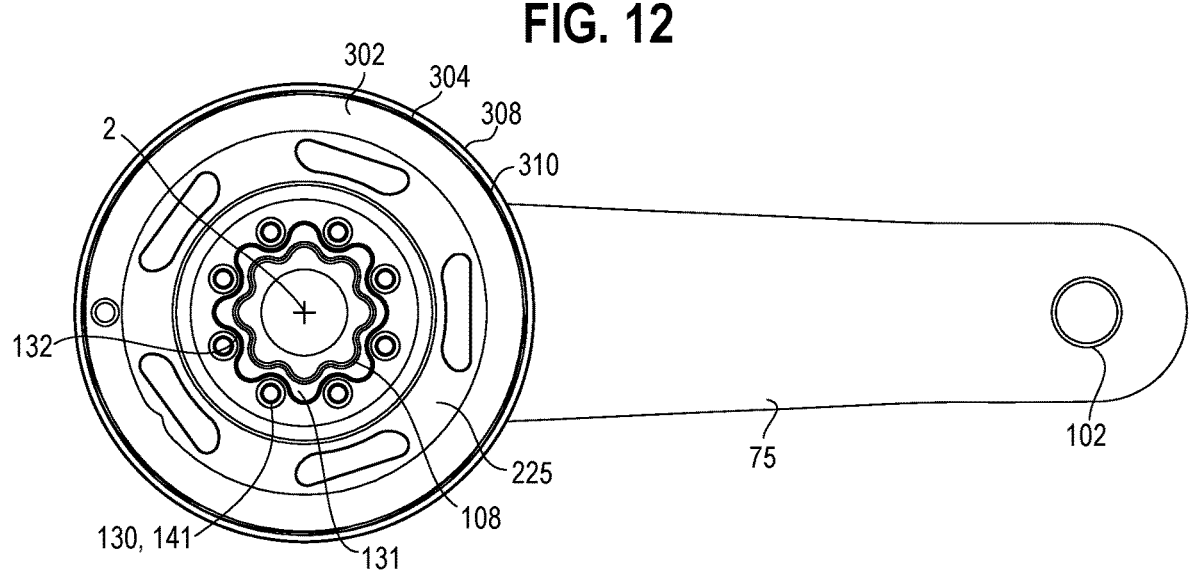
FIG. 12 is an inboard side view of a crank arm coupled to a chainring carrier.

For example, as shown in FIG. 12, a crank arm 75 and chainring carrier 302 may be attached with corresponding features and with a distinct torque transmitting connection, such as with a bolted connection. In this example, the chainring carrier 302 is sized and shaped to connect to the crank arm 75. A first pairing feature 131 is formed on one of the crank arm 75 and the chainring carrier 302 and a second pairing feature 132 is formed on the other of the crank arm 75 and the chainring carrier 302 to position the chainring carrier on the crank arm. A clearance is defined between the first and second pairing features 131, 132 when the first and second pairing features 131, 132 are paired. A torque-transmitting coupling 130, such as through bolted connection including bolts 141, is formed on the crank arm 75 and the chainring carrier 302 and is configured to transmit substantially all of the torque applied to the chainring carrier 302 from the crank arm 75.

A power meter cover 202 is provided to protect other power meter components installed within and/or on the body, such as a PCB assembly described below with respect to FIGS. 2, 3, and 7-13. The power meter cover 202 may be constructed of any material operable to provide for the protection of the internal power meter 200 components. For example, aluminum alloys may be used. In an embodiment, the power meter 360 may communicate signals wirelessly and the power meter cover 202 may be made of a material that is radio frequency ("RF") transparent, such as polycarbonate or other materials. The power meter cover 202 may be attached to the body, in this embodiment the chainring carrier 302, using any technique. For example adhesives may be used to attach the power meter cover 202. A power supply casing 204 is also provided to both secure and protect a power supply for the power meter 360. In an embodiment, the power supply casing 204 includes a removable power supply cover 205 to provide access to the power supply. A torque output section 222 is shown on the chainring carrier 302. Provided in the torque output section 222 in the displayed embodiment are torque output member attachment features 224, including the peripheral threads 304 and the interface between the shoulder stop surface 310 and the face of the chainring, which transmits the torque from the carrier to the chainring.

The chainring carrier 302 includes a strain measurement section 230, which may include one or more strain measurement features 232. The strain measurement features 232 are formed into the chainring carrier 302 to provide for positioning of strain measurement devices to detect and/or quantify mechanical deformations of the chainring carrier 302 due to torque applied between the torque input section 225 and the torque output section 222. For example, the strain measurement devices 260, and features 232, may be spaced apart by openings 231 formed in the base surface 233 of the annular cavity 230. The strain measurement devices 260 may be electrical resistance type strain gauges attached to the strain measurement features 232.

As shown in FIGS. 2, 8 and 9, the chainring carrier 302 includes the cavity 354 configured for installation of the PCB assembly 250 and/or other power meter 360 components. The cavity 354 may include an alignment feature 209 which corresponds to substrate alignment feature 254 formed in a substrate 252 of the PCB assembly 250. The power supply components are hidden from view, though the correlation of these alignment features 254, 209 the PCB assembly 250 may be appropriately aligned with the chainring carrier 302. Other alignment features may also be used and/or formed into the PCB substrate 252.

The PCB assembly 250 also includes a plurality of strain measurement devices 260 attached to the substrate 252 and/or other parts of the PCB assembly 250. The strain measurement devices 260 are configured to provide a signal indicative of strain in an attached body. The signal may be interpreted and acted upon by circuitry 28 of the power meter, schematically shown in FIG. 13. The circuitry 28 may be configured to interpret the signal indicative of strain, and calculate a corresponding mechanical power being transmitted through the attached body.

In the displayed embodiment the strain measurement devices 260 are attached at strain measurement device attachment features 258 formed in the substrate 252.

In the displayed embodiment, the strain measurement device attachment features 258 form a vacancy or void. The void may provide access to the strain measurement devices 260 in an axial direction of the PCB assembly 250, such as along a direction of the axis of rotation 2. This access may be used during installation of the PCB assembly 250 into a body such as the chainring carrier 302. For example, to generate a quality attachment of the strain measurement devices 260 a clamp may be used for attachment to the body during a curing process. As shown, the strain measurement device attachment features 258 are configured to allow the attachment of the strain measurement devices 260 so that the strain measurement devices do not protrude beyond an inner diameter 251 of the substrate 252. This configuration may provide for a maximized substrate 252 surface area available for circuitry implementation, but a minimized total surface area of the PCB assembly, particularly in an annular substrate implementation wherein such a configuration may optimize and/or minimize the radial extents of the PCB assembly installation. Further, the plurality of strain measurement device attachment features 258 may be disposed so as to be circumferentially spaced around the axis 2.

As shown, the strain measurement devices 260 are attached at a radially inner edge of the substrate 252. Alternatively, the strain measurement devices 260 may be attached at a radially out edge of the substrate 252, or between the radially inner and radially outer edge of the substrate 252.

The power supply for the power meter 200 is attached both physically and electrically using a contact structure and a metallic screw. As shown, the alignment feature 209 also provides for the attachment of the power supply for the power meter 200 using the metallic screw. Alignment features may be provided without facilitation for power supply attachment as well.

The PCB assembly 250 includes circuitry 28. The circuitry 28 may involve one or more processors 20, as well as other electric and/or electronic components as well as additional sensors 92, such as an accelerometer. The circuitry may also include one or more antennae 290 as part of the communication interface 90. Additional or alternative alignment features 255, 256 used for aligning the PCB assembly 250 to a body of a bicycle drivetrain may be formed into the substrate 252 of the PCB. For example, one or more notches 255 may be cut into an interior and/or exterior edge of the substrate 252. The notches 255 may be configured to correspond to corollary features of the body to which the PCB assembly 250 is to be attached. Also, one or more holes 256 may be formed in the substrate 252 which may be used by an assembly tool or handler to specifically attach to the PCB assembly 250 in a particular orientation. The tool and/or handler may then be aligned to the body to which the PCB assembly is to be attached such that the PCB assembly 250 is aligned properly to the body. For example, the alignment features 256, 255, 254 may be used independently or in combination to align the one or more strain measurement devices 260 to the body.

The substrate 252 operates to connect, and/or provide structure for the circuitry and attached components of the PCB assembly 250. The substrate 252 may be flexible or rigid. In an embodiment, the substrate 252 is a rigid substrate providing a durable basis for the PCB assembly 250. The substrate 252 is formed to provide shape and other substance for the PCB assembly 250. For example, as shown, the substrate 252 is formed in an annular construction and/or shape. Such an annular shape facilitates installation of the PCB assembly 250 around a torque input section of a body.

At least one strain measurement device 260 may be attached to the PCB assembly 250 such that the at least one strain measurement device 260 is fixed in a plane P of the PCB assembly 250 relative to at least one feature of the PCB assembly 250. For example, the strain measurement devices 260 may be fixed relative to one or more of the alignment features 254, 255, 256 and/or a circuitry 28 component such as the processor 20. The plane P may be a plane formed to include the substrate 252. In an embodiment, the plane P is perpendicular to the axis of rotation 105. An annular construction of the substrate 252, and rigid attachment of the strain measurement devices 260 as described above, provides for the disposition of a plurality of strain measurement devices 260 around the annular shape and about the torque input section. Such an annular construction also allows for the disposition of the strain measurement devices between the torque input section and the torque output section.

Figure 13:
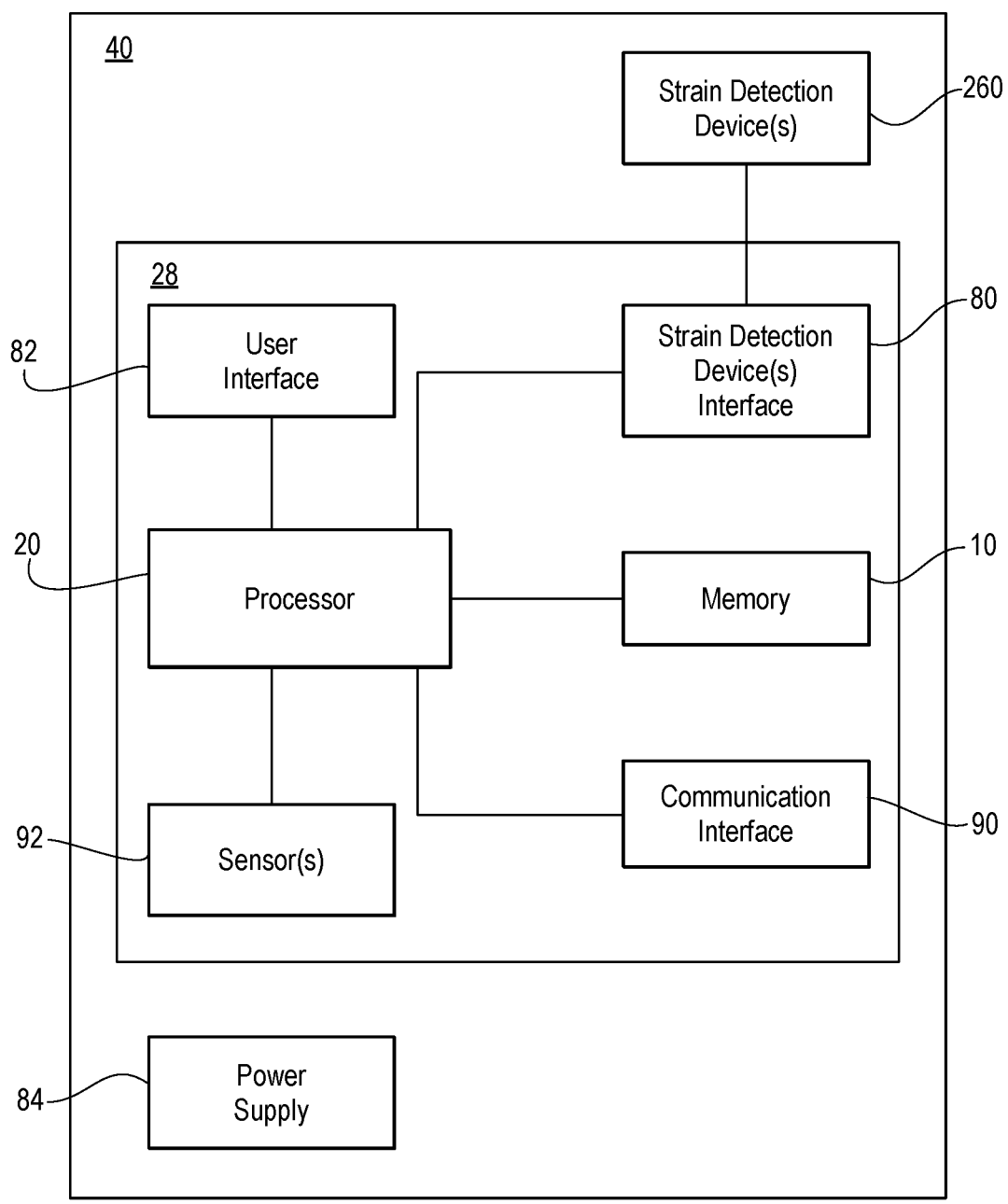
FIG. 13 is a block diagram of an embodiment of a power meter system.
Figure 14:
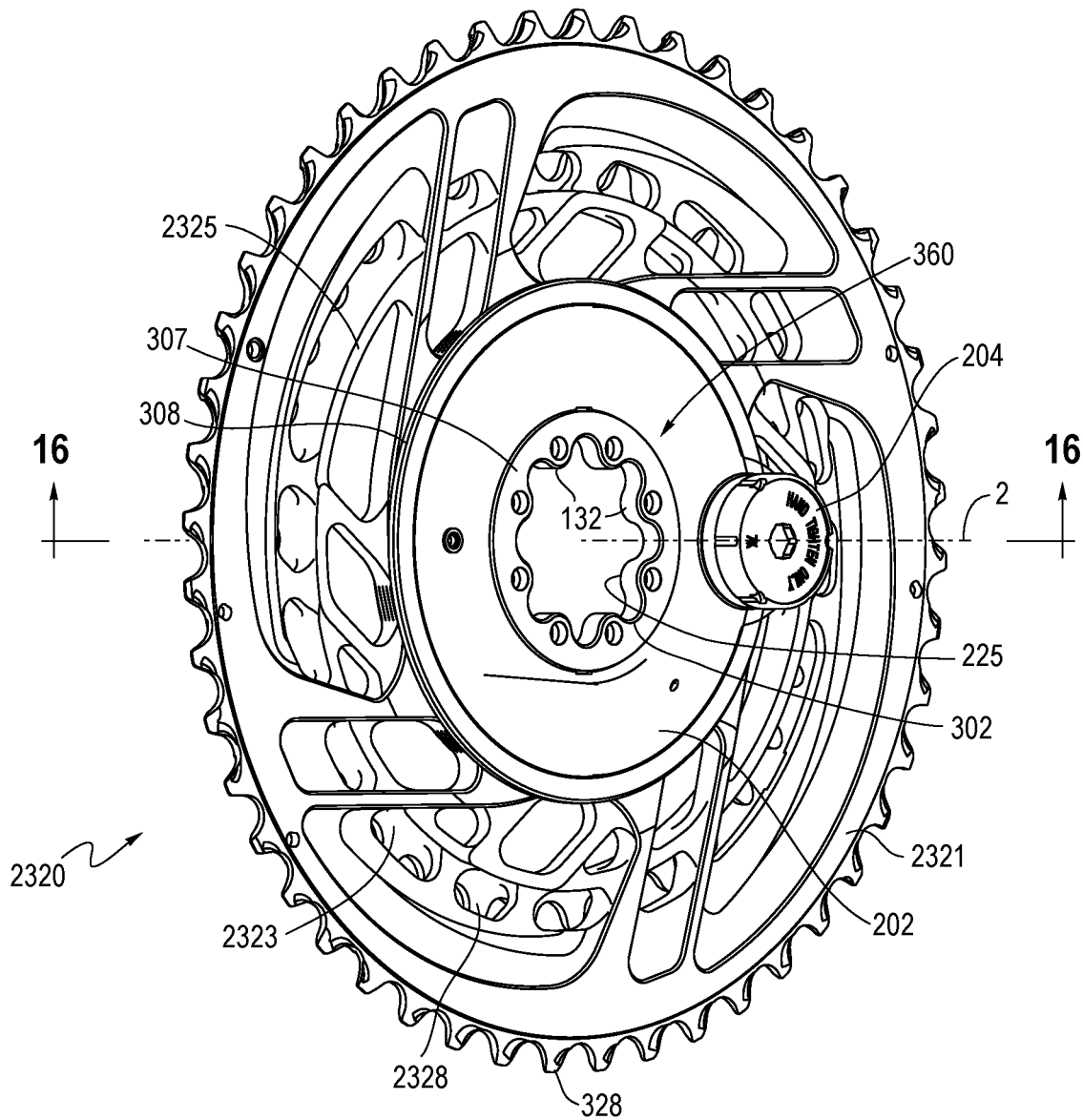
FIG. 14 is a front perspective view of another embodiment of a front chainring assembly including a power meter device.
Figure 15:
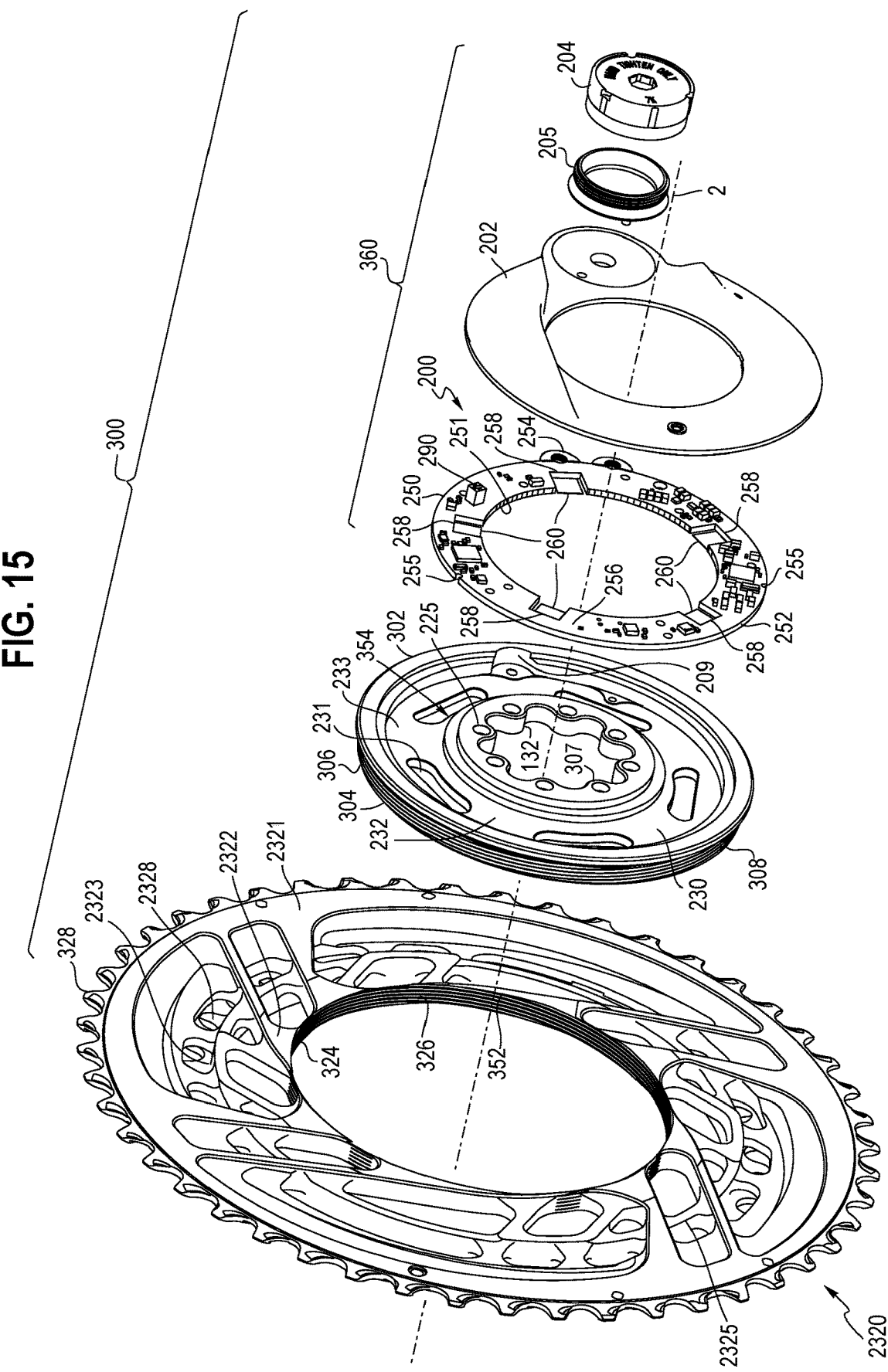
FIG. 15 is an exploded perspective view of the chainring assembly including the power meter device shown in FIG. 14.
Figure 16:
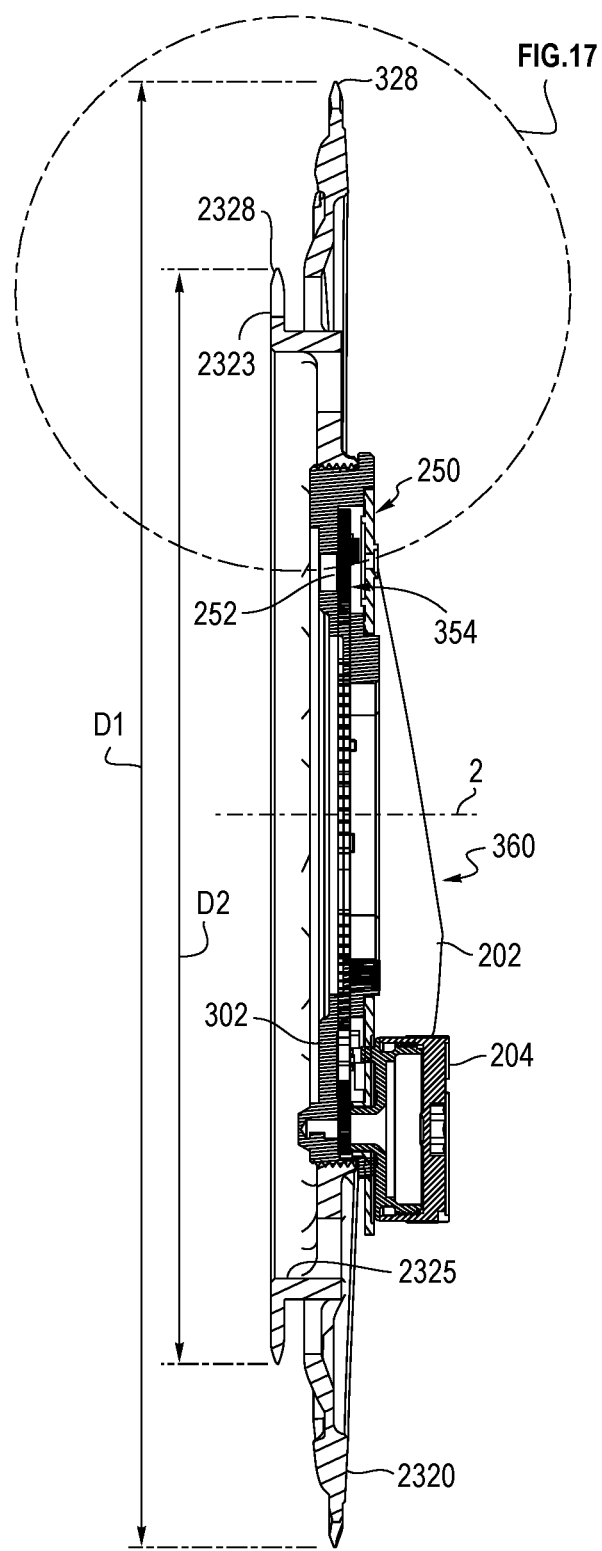
FIG. 16 is a cross-sectional view of the chainring assembly taken along line 16-16 in FIG. 14.
Figure 17:
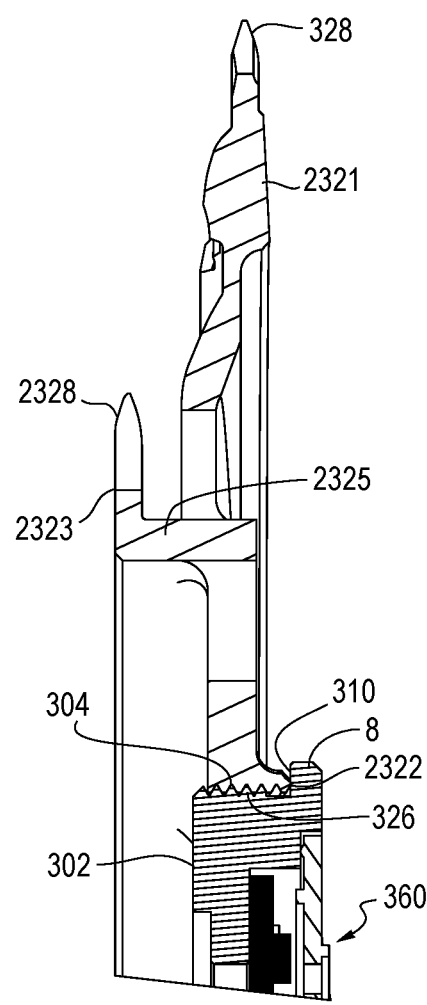
FIG. 17 is an enlarged partial cross-section of the chainring assembly taken along line 17 in FIG. 16.

FIG. 13 is a block diagram of an exemplary power meter system 40 for a bicycle. The system 40 may be used alone to communicate with and/or control bicycle components or other devices. The system 40 includes circuitry 28 which includes at least one processor 20 and a memory 10. In the illustrated embodiment, the circuitry 28 also includes a user interface 82, a strain detection device interface 80, and a communication interface 90. Circuitry 28 may also include component connections and/or electrically connecting materials embedded in a substrate material. The system also includes at least one strain detection device 260 in communication with the strain detection device communication interface 80. Additional, different, or fewer components are possible for the power meter system 40. For example, the user interface 82 may not be included in a circuitry 28 and/or the power meter system. Also, components may be combined. In an embodiment, the power meter system is integrated with a component of a power train of a bicycle, such as a chainring or chainring carrier, for example as is described with respect to FIGS. 2, 3 and 7-11.

The processor 20 may include a general processor, digital signal processor, an application specific integrated circuit (ASIC), field programmable gate array (FPGA), analog circuit, digital circuit, combinations thereof, or other now known or later developed processor. The processor 20 may be a single device or combinations of devices, such as through shared or parallel processing.

The circuitry 28 is operable to interpret a signal indicative of strain from deformation of an attached body from one or more of the strain detection devices 260 and determine a corresponding power transmitted between the torque input and the torque output section. For example, the signal may be communicated from the strain detection devices 260 to the processor 20 which may apply a conversion technique of the strain to a power transmitted across the body for a time period. Such a conversion technique may involve using the known material characteristics of the body, such as the modulus of elasticity and a known geometry of the body. Force values to cause amounts of strain measurable by the strain detection devices 260 may be known from these, or other, characteristics of the power meter system. For example, these values, or indications of these values, may be stored on a memory 10. The measured strain values may be matched against these values by the processor 20 to determine an input force, and a resulting power over time transmitted by the body of the drive train.

The memory 10 may be a volatile memory or a non-volatile memory. The memory 10 may include one or more of a read only memory (ROM), random access memory (RAM), a flash memory, an electronic erasable program read only memory (EEPROM), or other type of memory. The memory 10 may be removable from the power meter system 40, such as a secure digital (SD) memory card. In a particular non-limiting, exemplary embodiment, a computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory 10 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The power supply 84 is a portable power supply. The power supply may involve the generation of electric power, for example using a mechanical power generator, a fuel cell device, photo-voltaic cells, or other power generating devices. The power supply may include a battery such as a device consisting of two or more electrochemical cells that convert stored chemical energy into electrical energy. The power supply 84 may include a combination of multiple batteries or other power providing devices. Specially fitted or configured battery types, or standard battery types such as CR 2012, CR 2016, and/or CR 2032 may be used.

The communication interface 90 provides for data and/or signal communication from the power meter system 40 to another component of the bicycle, or an external device such as a mobile phone or other computing device. The communication interface 90 communicates the data using any operable connection. An operable connection may be one in which signals, physical communications, and/or logical communications may be sent and/or received. An operable connection may include a physical interface, an electrical interface, and/or a data interface. The communication interface 90 may be configured to communicate wirelessly, and as such include one or more antennae. The communication interface 90 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth® and or ANT+™ standards may also, or alternatively, be used. Accordingly, replacement standards and protocols having the same or similar functions as those disclosed herein are considered equivalents thereof. In an embodiment, the communication interface 90 may be configured to transmit a signal indicative of a power determined from a measured strain of a body. Further, the determined power may be transmitted wirelessly.

The strain detection device interface 80 provides for data and/or signal communication from one or more strain detection devices 260 to the power meter circuitry 28. The interface 80 communicates using wired and/or wireless communication techniques. For example, the interface 80 communicates with the strain detection devices 260 using a system bus, or other communication technique. The strain detection device interface 80 may include additional electric and/or electronic components, such as an additional processor and/or memory for detecting, communicating, and/or otherwise processing signals of the strain detection devices 260.

The user interface 82 may be one or more buttons, keypad, keyboard, mouse, stylus pen, trackball, rocker switch, touch pad, voice recognition circuit, or other device or component for communicating data between a user and the power meter system 40. The user interface 82 may be a touch screen, which may be capacitive or resistive. The user interface 82 may include a liquid crystal display ("LCD") panel, light emitting diode ("LED"), LED screen, thin film transistor screen, or another type of display. The user interface 82 may also include audio capabilities, or speakers.

In an embodiment, the user interface 82 includes an LED indicator. The LED indicator lights to indicate input of the commands or other actions of the power meter system.

The communication interface 90 is configured to send and/or receive data such as control signals and/or commands to and/or from bicycle components such as the front gear changer 30 and/or the shift units 26. The component communication interface 90 communicates the data using any operable connection. An operable connection may be one in which signals, physical communications, and/or logical communications may be sent and/or received. An operable connection may include a physical interface, an electrical interface, and/or a data interface. The communication interface 90 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system, such as the circuitry 28. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or a power meter system 40 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Although embodiments have been described for illustrative purposes, those skilled in the art will appreciate that various modifications, additions, and substitutions are possible, without departing from the scope and spirit of the disclosure. It is therefore intended that the foregoing description be regarded as illustrative rather than limiting, and that it be understood that all equivalents and/or combinations of embodiments and examples are intended to be included in this description.

Although certain parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A front chainring assembly comprising:
a chainring carrier adapted to be coupled to a crank arm, wherein the chainring carrier is rotatable about a rotation axis, and wherein the chainring carrier comprises an outer periphery comprising carrier threads; and
a chainring structure comprising an inner periphery comprising chainring threads and an outer periphery comprising a plurality of teeth, wherein the inner periphery of the chainring structure is threadably engaged with the outer periphery of the chainring carrier, the chainring threads having an axial width greater than an axial width of the plurality of teeth.

2. The front chainring assembly of claim 1, wherein the chainring carrier comprises an annular shoulder extending radially outwardly adjacent the carrier threads on the outer periphery of the carrier, wherein the annular shoulder defines a stop surface, wherein the chainring structure is rotatable relative to the chainring carrier between a disengaged position and an engaged position, wherein the chainring structure engages the stop surface when in the engaged position.

3. The front chainring assembly of claim 1, wherein at least the carrier threads comprise nine thread starts.

4. The front chainring assembly of claim 1, wherein the carrier threads and the chainring threads comprise a helix angle that is equal to or between 0.5° and 2.0°.

5. The front chainring assembly of claim 1, wherein the chainring carrier comprising an annular cavity disposed radially between the inner and outer peripheries of the chainring carrier, the chainring carrier comprising a power meter device disposed within the annular cavity, the power meter device configured to determine the power transmitted between the inner periphery of the chainring carrier and the outer periphery of the chainring carrier.

6. The front chainring assembly of claim 5, wherein the power meter comprises a plurality of strain measurement devices attached to a base surface of the annular cavity, the strain measurement devices spaced apart by openings in the base surface of the annular cavity.

7. The front chainring assembly of claim 1, further comprising a crank arm.

8. The front chainring assembly of claim 7, further comprising a first pairing feature formed on one of the crank arm and the chainring carrier and a second pairing feature formed on the other of the crank arm and the chainring carrier to position the chainring carrier on the crank arm, and to provide a torque-transmitting coupling between the crank arm and the chainring carrier.

9. The front chainring assembly of claim 1, wherein the chainring structure comprises a first portion comprising the plurality of teeth and a second portion comprising the chainring threads, wherein the first portion is releasably coupled to the second portion.

10. The front chainring assembly of claim 9, wherein the first portion is releasably coupled to the second portion with a plurality of fasteners.

11. The front chainring assembly of claim 1, wherein the chainring structure includes a single chainring and the plurality of teeth comprises a first group of teeth and a second group of teeth, the first group of teeth having an axial width greater than an axial width of the second group of teeth.

12. The front chainring assembly of claim 1, wherein the chainring structure comprises a first chainring axially spaced from a second chainring, the plurality of teeth comprising a first plurality teeth on an outer periphery the first chainring and a second plurality of teeth on an outer periphery of the second chainring, wherein the first plurality of teeth is greater than the second plurality of teeth.

13. The front chainring assembly of claim 1, wherein the carrier threads comprise at least three thread starts.

* * * * *